No. 800,176. PATENTED SEPT. 26, 1905.
H. SIMPSON.
MANDREL.
APPLICATION FILED JUNE 7, 1905.
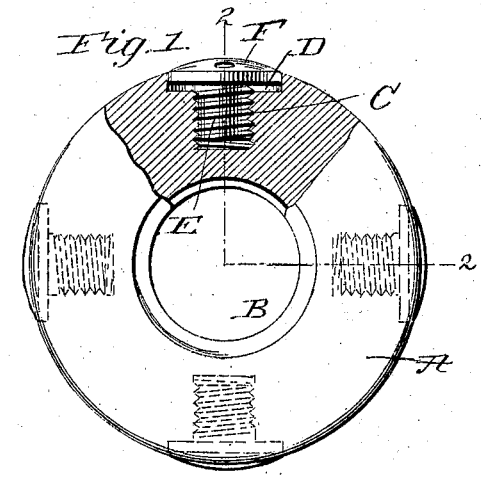
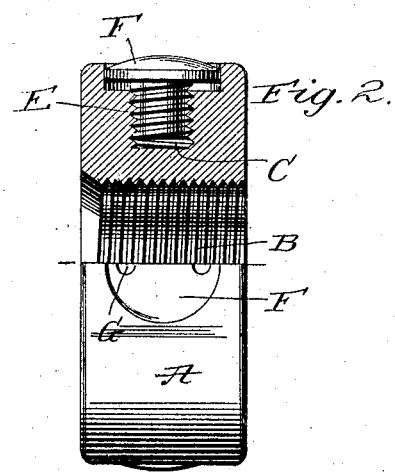
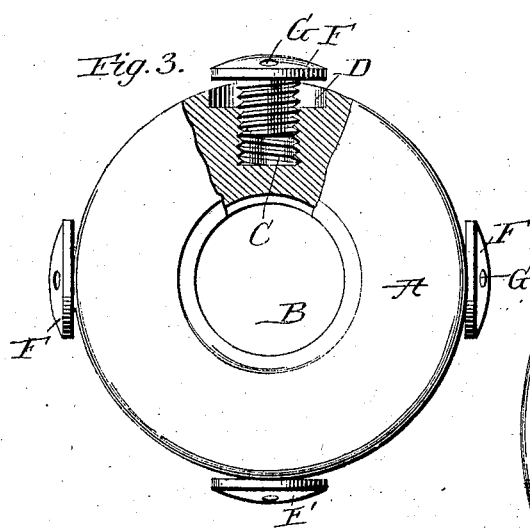
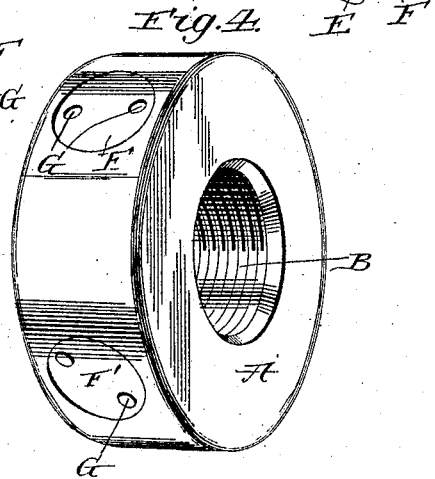
Witnesses
Inventor:
Henry Simpson
By
Dodge and Sons,
Attorneys

UNITED STATES PATENT OFFICE.

HENRY SIMPSON, OF ELMIRA, NEW YORK.

MANDREL.

No. 800,176.  Specification of Letters Patent.  Patented Sept. 26, 1905.

Application filed June 7, 1905. Serial No. 264,169.

*To all whom it may concern:*

Be it known that I, HENRY SIMPSON, a citizen of the United States, residing at Elmira, in the county of Chemung and State of New York, have invented certain new and useful Improvements in Mandrels, of which the following is a specification.

My present invention pertains to improvements in mandrels or work-holders designed more particularly for use in the manufacture of wood pipe. In turning the reduced end upon a pipe-section it is essential that the pipe be securely held in order that the end may be true, and thus make a tight joint with the socket in the adjacent section when they are placed in position. In the manufacture of such pipes it is impossible to secure an entirely even or true bore, and consequently it is difficult to hold the pipe securely when the turning operation is being carried on.

The mandrel shown in the annexed drawings has in practice been found to give efficient results and to thoroughly overcome the difficulties heretofore encountered.

In said drawings, Figure 1 is a face view of the mandrel, a portion thereof being broken away to show the form of one of the expanding members or shoes; Fig. 2, a side elevation, partly in section, the sectional portion being taken on the line 2 2 of Fig. 1; Fig. 3, a front elevation, partly broken away, showing the shoes expanded or moved outwardly; Fig. 4, a perspective view of the mandrel, the shoes being moved inwardly to the greatest extent; and Fig. 5, a like view of one of the shoes.

A denotes the body portion, which is circular in form and provided with a centrally-disposed threaded opening B. A series of radial threaded openings C is formed in the body and extend inwardly from the edge thereof or from an enlarged recess or pocket D. (See Fig. 3.) Four of such threaded openings and recesses are shown. The shoes which are employed in conjunction with said openings and recesses are shown as moved inwardly to their greatest extent in Figs. 1, 2, and 4, whereas in Fig. 3 the shoes are moved outwardly, so that the exterior faces thereof project beyond the periphery of the body portion to a considerable extent. Each of said shoes comprises a threaded stem E and a rounded head F, the outer face of said head being convexed or curved, as best shown in Figs. 1, 2, and 3. The head will preferably be formed with two sockets or openings G for the reception of a pronged screw-driver or wrench, by which the shoes may be turned, and thereby moved inwardly or projected outwardly to the desired extent. The body portion is of course made of a size corresponding to the minimum interior diameter or bore of the pipe and may be forced inwardly, so as to clamp the pipes when the parts are in the positions shown in Fig. 1. If, however, the diameter of the pipe exceed that of the body portion, the shoes may be moved outwardly in a radial direction or into the position shown in Fig. 3, the convex faces thereof permitting the mandrel thus expanded to be readily forced into the pipe and secure a firm hold thereon.

Having thus described my invention, what I claim is—

1. In a tool of the character specified, the combination of a body portion; and a series of shoes movable radially with reference to the body, the outer faces of the shoes being convex, and the face of each shoe curving downwardly in all directions from a central point to the periphery thereof, substantially as and for the purpose set forth.

2. In a tool of the character specified, the combination of a body portion provided with a series of radially-disposed threaded openings; a shoe mounted in each of said openings, each shoe comprising a threaded stem and a head portion, the outer face of which is rounded, substantially as described.

3. In a tool of the character specified, the combination of a body portion provided with a series of radially-disposed threaded openings and a pocket or recess formed in line with each of said openings; and a shoe mounted in each threaded opening, each shoe comprising a threaded stem and a head, the outer face of which is convex, substantially as described.

4. In a tool of the character specified, the combination of a body portion circular in form and provided with a series of radially-disposed threaded openings and with a pocket or recess of larger diameter standing in alinement with each of said threaded openings; and a series of shoes, each shoe comprising a threaded stem and a head portion, the outer face of which is convex.

5. In a tool of the character specified, the combination of a body portion circular in form and provided with a centrally-disposed threaded opening, and with a series of radially-disposed threaded openings extending inwardly from pockets or recesses formed about the periphery of the body; and a shoe mounted in each of said radially-disposed openings, each shoe comprising a threaded stem and a round head of a size adapted to fit the recess, the outer face of each head being convex and provided with sockets or openings for the application of a wrench or the like, substantially as described.

In testimony whereof I have signed my name to this specification in the presence of two subscribing witnesses.

HENRY SIMPSON.

Witnesses:
E. S. GIBBS,
MORRIS NEWMARK.